United States Patent
Wang et al.

(10) Patent No.: US 6,698,663 B2
(45) Date of Patent: Mar. 2, 2004

(54) MODEL-BASED METHOD OF GENERATING CONTROL ALGORITHMS FOR AN AUTOMATIC CLIMATE CONTROL SYSTEM

(75) Inventors: Mingyu Wang, Amherst, NY (US); Charles Andrew Archibald, Lockport, NY (US); Lin-Jie Huang, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/310,167

(22) Filed: Dec. 4, 2002

(65) Prior Publication Data

US 2003/0146290 A1 Aug. 7, 2003

Related U.S. Application Data

(60) Provisional application No. 60/354,110, filed on Feb. 4, 2002.

(51) Int. Cl.[7] ............................. F24F 7/00; G06F 17/50
(52) U.S. Cl. ............................. 236/49.3; 62/229; 703/8
(58) Field of Search .................... 236/49.3, 94; 62/229, 62/125, 127; 703/7, 8; 706/45, 46

(56) References Cited

U.S. PATENT DOCUMENTS

| | | | |
|---|---|---|---|
| 5,111,413 A | * | 5/1992 | Lazansky et al. ............ 364/578 |
| 5,170,935 A | * | 12/1992 | Federspiel et al. ......... 236/44 C |
| 6,209,794 B1 | | 4/2001 | Webster et al. ............... 236/94 |
| 6,477,518 B1 | * | 11/2002 | Li et al. ........................ 706/45 |
| 6,487,525 B1 | * | 11/2002 | Hall et al. ....................... 703/7 |

OTHER PUBLICATIONS

Taeyoung Han et al, "Virtual Thermal Comfort Engineering," SAE #2001–01–0588.

* cited by examiner

Primary Examiner—Marc Norman
(74) Attorney, Agent, or Firm—Patrick M. Griffin

(57) ABSTRACT

Optimized control algorithms for a vehicle automatic climate control system (ACCS) are developed using math-based models of the vehicle, the ACCS and a vehicle occupant. The models are cross-coupled in closed-loop fashion with feedback from both vehicle systems and occupant. A first feedback loop including the vehicle and the ACCS, simulates how the ACCS interacts with the cabin environment; and a second feedback loop including the vehicle, the ACCS and the occupant, simulates how the occupant will adjust the ACCS to optimize comfort. When the system arrives at a control algorithm that satisfies control objectives and optimizes occupant comfort, an auto-code generation tool is used to create program code directly from the control model, which may be downloaded into a test vehicle for final system confirmation and calibration.

8 Claims, 3 Drawing Sheets

MODEL-BASED METHOD OF GENERATING CONTROL ALGORITHMS FOR AN AUTOMATIC CLIMATE CONTROL SYSTEM

PRIOR APPLICATION

This application claims the benefit of prior Provisional Patent Application Serial No. 60/354,110 filed Feb. 4, 2002.

TECHNICAL FIELD

This invention relates to automatic climate control systems for vehicles, and more particularly to a method of generating control system algorithms that optimize occupant comfort.

BACKGROUND OF THE INVENTION

In an automotive automatic climate control system (ACCS), the driver generally selects a desired cabin temperature, and a microprocessor-based system controller responds in a pre-programmed way to control the blower speed, the air discharge temperature and the air delivery mode. While the driver has the option of overriding the pre-programmed settings, the objective is to design the control algorithms so that the pre-programmed settings sufficiently satisfy the occupants that little or no overriding is necessary. This presents a very difficult challenge to system and calibration engineers because control settings that satisfy the engineers may only satisfy a small subset of the overall population of vehicle occupants. For this reason, and in order to reduce development time, there has been a trend toward increased usage of math-based tools to simulate and analyze system operation, and to compare the performance achieved with different system designs and control approaches. See, for example, the U.S. Patent to Webster et al. U.S. Pat. No. 6,209,794, where mathematical models of a vehicle and thermal management system are utilized to evaluate the impact of different system designs on the time required for the cabin to reach a comfortable temperature.

While math-based tools have the capability of accelerating the validation process and significantly reducing product development time, the fact remains that it is difficult to develop control strategies that satisfactorily address occupant comfort. Even in cases where occupant comfort standards are reasonably well defined, many design iterations are required to develop a control algorithm that will satisfy the defined comfort standards. Accordingly, what is needed is an improved method of applying math-based tools to the control algorithm design process that minimizes the number of design iterations required to arrive at a solution that optimizes occupant comfort.

SUMMARY OF THE INVENTION

The present invention is directed to an improved method of developing optimized control algorithms for a vehicular automatic climate control system (ACCS). According to the invention, math-based models are utilized to simulate the vehicle, the ACCS and the occupant, and the models are cross-coupled in closed-loop fashion with feedback from both vehicle and occupant. A first feedback loop including the vehicle and the ACCS simulates how the ACCS interacts with the cabin environment; and a second feedback loop including the vehicle, the ACCS and the occupant simulates how the occupant will adjust the ACCS to optimize comfort. When the control algorithm satisfies the control objectives and optimizes occupant comfort, an auto-code generation tool is used to create program code directly from the control model, which may be downloaded into a test vehicle for final system confirmation and calibration.

DESCRIPTION OF THE PREFERRED EMBODIMENT

Figure 1:
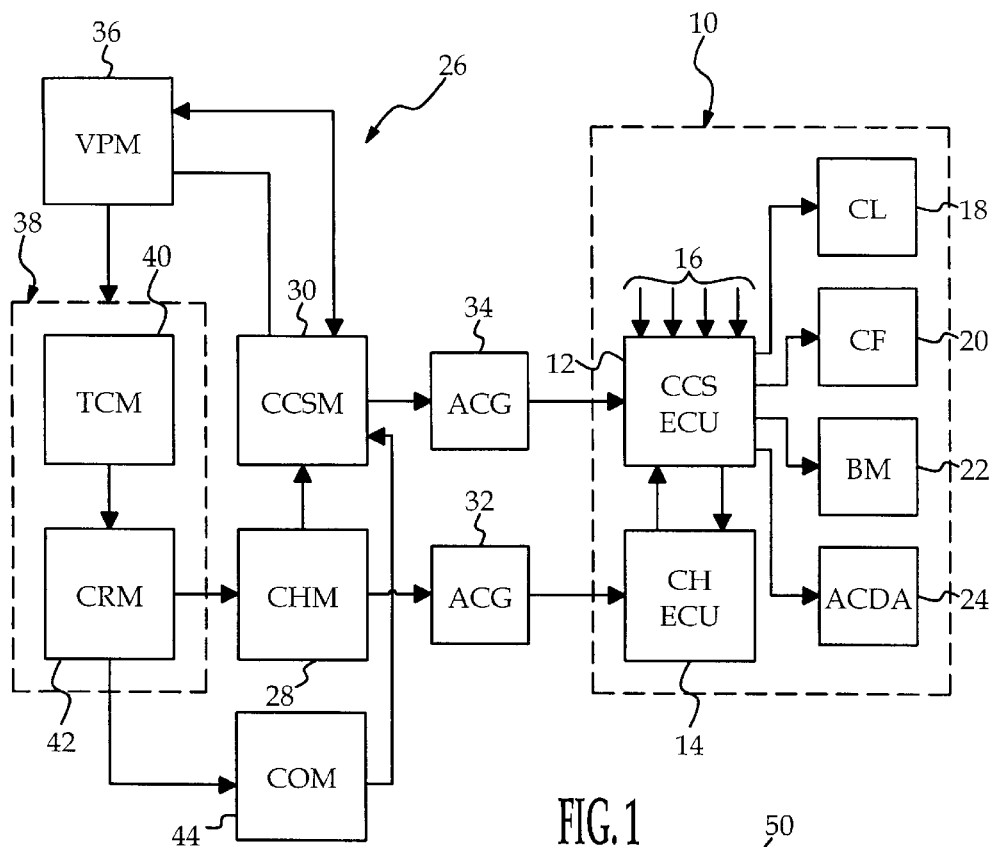
FIG. 1 is a block diagram illustrating the simulation of a vehicle, its automatic climate system and its occupants according to this invention, along with automatic code generation tools for transferring simulated control algorithms to a physical automatic climate control system in an actual vehicle.

FIG. 1 illustrates the method of the present invention in the context of a conventional motor vehicle automatic climate control system (ACCS) 10 including two electronic control units (ECUs): a climate control system (CCS) ECU 12, and a control head (CH) ECU 14. In vehicle operation, the CCS ECU 12 interacts with the CH ECU 14, receives various inputs 16 pertaining to ambient conditions and actual cabin temperature, and produces various outputs, including command signals for a compressor clutch (CL) 18, a condenser fan (CF) 20, a blower motor (BM) 22, and a number of air control doors actuators (ACDA) 24. The CH ECU 14 resides in a user interface, generally referred to as a control head, whereby the driver or other occupant can set the desired cabin temperature and manually override the control settings of the blower motor 22 and air control doors 24. The CH ECU 14 can also display data received from CCS ECU 12, such as the outside temperature. Of course, the CCS ECU 12 and the CH ECU 14 may be combined into a single ECU if desired.

In carrying out the above-mentioned control functions, the CCS ECU 12 and the CH ECU 14 each have embedded control algorithms that are periodically executed by an internal microprocessor. Such algorithms are ordinarily developed by systems engineers, and converted into suitable program code for storage in non-volatile memory within the respective ECU. The vehicle is then subjected to a fairly rigorous testing regimen, during which the control algorithms are adjusted and calibrated to optimize system performance, which may be defined in terms of transient performance, steady-state temperature regulation, and occupant comfort, for example. However, the present invention contemplates a totally different control algorithm development methodology in which the control algorithms for CCS ECU 12 and CH ECU 14 are generated off-line in a simulation environment defined by various interlinked mathematical models, designated generally in FIG. 1 by the reference numeral 26. These models include a control head model (CHM) 28, a climate control system model (CCSM) 30, a vehicle plant model (VPM) 36, a thermal comfort model (TCM) 40, and a comfort reaction model (CRM) 42. The automatic code generation (ACG) units 32 and 34 link the simulation environment models 26 to ACCS 10 by generating program code for CH ECU 14 and CCS ECU 12 based on the functionality of CHM 28 and CCSM 30, respectively. The simulation environment models 26 are implemented with a mixture of commercially available software tools and custom developed applications. The ACG units 32 and 34 produce C code from the transfer functions of CHM 28 and CCSM 30; the ACG unit 32 can be implemented using the DeepScreen tool developed and marketed by Altia Inc., and the ACG unit 34 can be implemented with the Real Time Workshop Embedded Coder developed and marketed by The MathWorks Inc.

In general, CCSM 30 interacts bi-directionally with VPM 36, which simulates the mechanical and thermal response of the vehicle to ambient conditions and the outputs of CCSM 30. For example, VPM 36 supplies information concerning the simulated compressor speed, cabin air temperature and engine coolant temperature to CCSM 30, and CCSM 30 supplies information concerning the simulated air control door positions, blower motor speed, and compressor clutch state to VPM 36. The VPM 36 supplies simulated cabin environment information (such as air discharge temperature, air velocity, and air delivery locations) to an occupant model 38 that comprises TCM 40 and CRM 42. The TCM 40 simulates comfort levels for various body segments (torso, arms, legs, head, etc.) of the occupants, and the CRM 42, in turn, simulates how the occupants will adjust the user inputs (desired temperature, blower motor speed, and air delivery mode) of the CHM 28 to maximize comfort. Thus, there is a first feedback loop including VPM 36 and CCSM 30 simulating how the climate control system interacts with the cabin environment, and a second feedback loop including CCSM 30, CHM 28, VPM 36, TCM 40, CRM 42 simulating how the occupant will adjust the climate control system to optimize comfort. Additionally, the comfort optimization module (COM) 44 adjusts the calibration parameters of CCSM 30, as shown. The simulated adjustments supplied to CHM 28 and CCSM 30 produce corresponding adjustment of the simulated control algorithms for CHM 28 and CCSM 30 until the control algorithms produce a simulated vehicle environment that satisfies the occupant model 38, obviating further adjustment of the user inputs of CHM 28. At such point, the ACG units 32, 34 create program code corresponding to the CCSM and CHM control functions, which is compiled and downloaded into CCS ECU 12 and CH ECU 14 for final in-vehicle validation and calibration.

Figure 2:
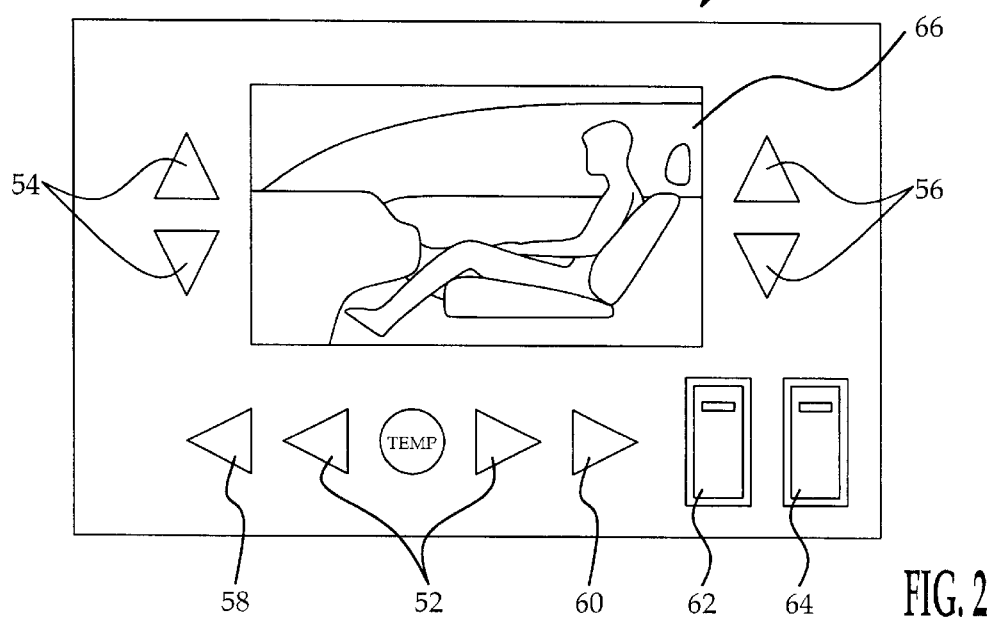
FIG. 2 depicts a visual interface of a control head model of a simulated automatic climate control system according to this invention.

The CHM 28 is implemented with the Altia Design/FacePlate software package developed and marketed by Altia Inc., and includes a visual interface, generally designated by the reference numeral 50 in FIG. 2. Referring to FIG. 2, the button pair 52 controls the driver set temperature, the button pair 54 controls the blower speed, the button pair 56 control the air discharge mode, and the buttons 58 and 60 activate full cold and hot settings with cabin air recirculation. Additionally, the buttons 62 and 64 activate defrost and rear defog functions, and the display panel 66 provides visual feedback to the occupants. Behind the graphical interface is logic that decodes the activation of the buttons 52–64 into commands for CCSM 30 and occupant feedback via indicators on display panel 66. In many cases, the decode logic may affect several system operations; for example, when the Defrost button 62 is activated, the mode override is set to deliver air to the windshield, the air inlet door commanded to a position for introducing outside air, and the refrigerant compressor is activated to de-humidify the discharge air.

Figure 3:
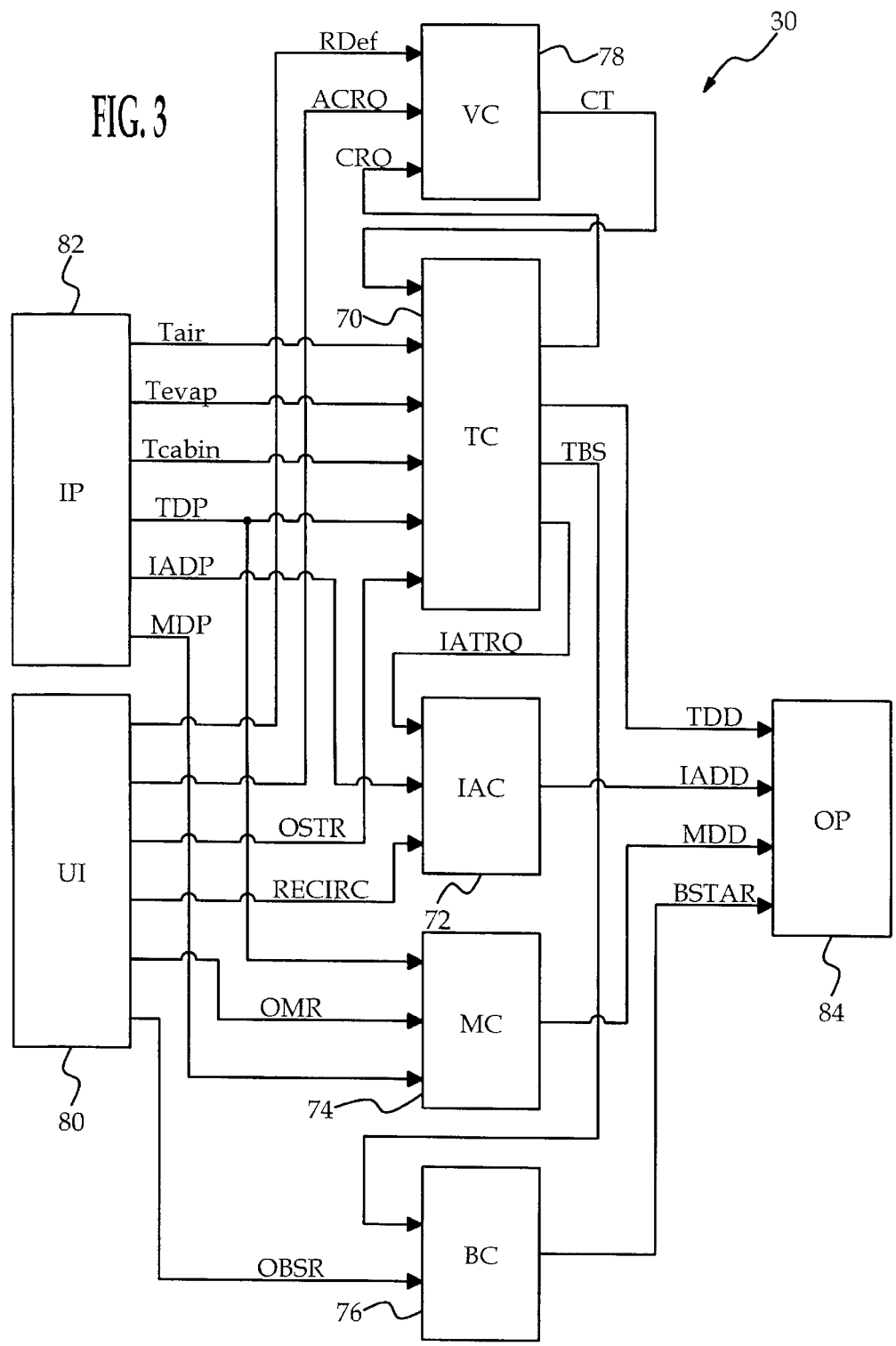
FIG. 3 is a block diagram of a simulated automatic climate control algorithm according to this invention.

The CCSM 30 is implemented with the MatLab software package (MatLab, Simulink, StateFlow) developed and marketed by The MathWorks Inc. Essentially, the MatLab software package acts as a backplane, providing easy interfacing with the VPM 30 and the occupant model 38. The model describes a desired transfer function, and becomes an executable specification which ACG 34 converts into C program code. Functionally, the control algorithm carried out by CCSM 30 includes a transient phase during which the initial cabin air temperature transitions to a set temperature TSET, and a steady-state phase during which the cabin air temperature is maintained at TSET while the vehicle is subjected to various ambient temperature and solar conditions. FIG. 3 depicts a high level block diagram of CCSM 30; in practice, each of the depicted blocks is further defined by a set of sub-blocks, which can be further defined by another set of sub-blocks until the function is completely described using the primitive blocks of Simulink or custom defined blocks.

Referring to FIG. 3, CCSM 30 includes a temperature controller (TC) 70, an inlet air controller (IAC) 72, a mode controller (MC) 74, and a blower controller (BC) 76 for implementing an automatic climate control algorithm. Interaction between the blocks 70–76 can be seen via the various connecting signals. For example, TC 70 develops a temperature blower speed TBS which is provided to BC 76 along with a blower speed request (BSR) from CHM 28, and BC 76 selects a blower speed target BSTAR based on the two inputs. The TC 70 also develops a temperature related inlet air request IATRQ, which is provided to IAC 72 along with a RECIRC request from CHM 28, and IAC 72 selects an inlet air door position delta based on the two inputs. A vehicle communications block (VC) 78 simulates interaction with other vehicle controllers, allowing CCSM 30 to control the air conditioning compressor (CRQ) and shared devices such as engine cooling fans, and to receive shared sensor data such as engine speed, vehicle speed, battery voltage, and coolant temperature CT. The user interface block (UI) 80 permits data sharing between CCSM 30 and CHM 28, and the input and output processing blocks (IP, OP) 82, 84 permit data sharing between CCSM 30 and VPM 36. For example, UI 80 receives inputs concerning rear defogger RDef, air conditioning enable/disable ACRQ, occupant set temperature requests OSTR, cabin air recirculation RECIRC, occupant air delivery mode requests OMR, and occupant blower speed requests OBSR. The input processing block 82 receives data from VPM 36 concerning the discharge air temperature Tair, the evaporator outlet air temperature Tevap, the cabin air temperature Tcabin, the temperature door position TDP, the mode door position MDP, and the air inlet door position IADP. Similarly, the output processing block 84 provides data to VPM 36 concerning the target blower speed BSTAR, and position deltas TDD, IADD, MDD for the temperature, air inlet and mode doors.

Figure 4:
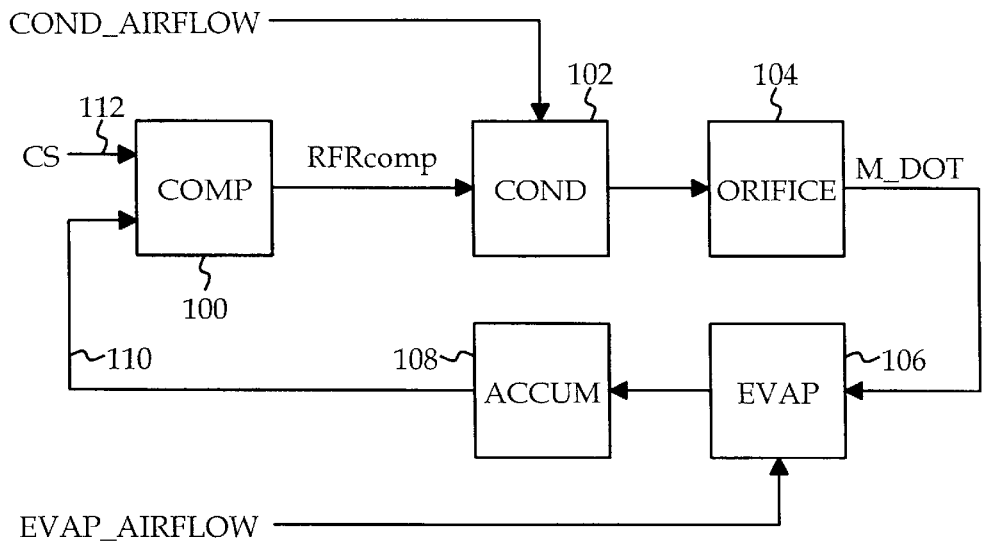
FIG. 4 is a block diagram of a simulated vehicle climate control plant according to this invention.

In general, the VPM 36 simulates the performance of the air conditioning system, and develops data pertaining to the discharge air velocity, delivery locations, and temperatures. The VPM 36 is implemented using the EASY5 Simulation package developed by Boeing Corporation and the computational fluid dynamics (CFD) package developed by Fluent Inc., and includes a model of the transient behavior of an air conditioning (AC) system. The transient AC model is illustrated by the block diagram of FIG. 4, and includes five main components: a refrigerant compressor 100, a condenser 102, and orifice tube 104, an evaporator 106, and an accumulator 108.

The compressor model 100 receives inputs pertaining to accumulator output vapor flow on line 110 and the compressor drive speed (CS) on line 112, and implements empirically determined isentropic efficiency and volumetric efficiency maps characterizing a particular compressor design. The refrigerant flow rate output RFRcomp is calculated according to:

$$RFRcomp = Vd * CS * VE * Ds$$

where Vd is the compressor displacement, VE is the volumetric efficiency, and Ds is the density of the inlet refrigerant. The compressor work is calculated based on the outlet pressure, the state point of the inlet refrigerant, and the isentropic efficiency (which can be empirically determined).

The condenser and evaporator models 102, 106 each receive inputs pertaining to refrigerant flow and the respective airflows (COND_AIRFLOW, EVAP_AIRFLOW), and describe the refrigerant outlet state. The models comprehend the geometries of the respective devices (tube lengths, heat transfer areas, etc.), and the refrigerant-side and the air-side heat transfer coefficients, and maintain a transient energy balance between the refrigerant-side and the air-side. The evaporator model 106 additionally comprehends the formation of condensate and its impact on heat transfer.

The orifice tube model 104 predicts the refrigerant flow rate m_dot given the upstream state and the downstream pressure, and can be implemented as follows:

$$m\_dot = C_{tp} * A_s [2 * g * D_i (P_{up} - P_f)]^{1/2}$$

where $C_{tp}$ is a two-phase quality correction factor, $A_s$ is the cross-sectional area, $D_i$ is the inlet refrigerant density, $P_{up}$ is inlet refrigerant pressure, and $P_f$ is the adjusted downstream refrigerant pressure.

The TCM 40 is implemented by custom application software, and includes sub-models that simulate the occupant thermal environment and human physiology. The occupant thermal environment sub-model is implemented with Fluent's CFD software, and simulates the vehicle cabin, taking into account solar loading and radiation heat exchange between the cabin and the occupant. Solar loading increases occupant and cabin temperatures, and varies with the transmission properties of the cabin glass, the solar angle and intensity and the solar spectrum. The heat flux due to solar radiation is modeled by separately considering the short-wave radiation which is absorbed based on skin or clothing absorptance, and long-wave radiation which is absorbed based on skin or clothing emittance. Radiation heat transfer between the cabin and the occupant is calculated using an explicit 3-D occupant model defined by the Stefan-Boltzmann law. The CFD software computes view factors characterizing the radiation heat transfer between the cabin surfaces and the various body segments of the occupant. The occupant thermal environment sub-model divides the cabin into finite volumes, and Reynolds-averaged Navier-Stokes equations for the various volumes are solved simultaneously with a conservation of energy equation to predict airflow, temperature and humidity distribution around the occupants. The human physiology sub-model, in turn, calculates the thermal responses of various body segments in terms of skin and core temperatures. In the illustrated embodiment, the simulated occupant is divided into sixteen body segments consisting of clothing and defined layers (core, muscle, fat and skin tissue), and a vascular model dictates convective heat transfer among the various segments. The portion of each segment that is in contact with an interior surface of the cabin is specified, and as mentioned above, radiative heat transfer between the cabin surfaces and the various body segments is computed by the CFD view factors. The output is in the form of Equivalent Homogeneous Temperature (EHT) data for each of the sixteen body segments, and if desired, the model may be expanded to include the effects of humidity on occupant comfort. A more detailed description of the modeling techniques is set forth, for example, in the SAE Paper No. 2001-01-0588 authored by Han, Huang, Kelly, Huizenga and Hui, and entitled Virtual Thermal Comfort Engineering.

The CRM 42 receives the EHT data developed by TCM 40, as well as the air discharge location and velocity data, and creates a discomfort function (DF) based on deviations in the EHT data from optimal EHT values. When the discomfort function reaches at least a certain level, CRM 42 reacts by proportionately adjusting one or more of the manual override settings of the CHM 28. While the blower speed or mode overrides occur without delay, some time is required to change the temperature of the cabin, and the CRM 42 models human patience so that the controls are not adjusted too frequently.

Figure 5:
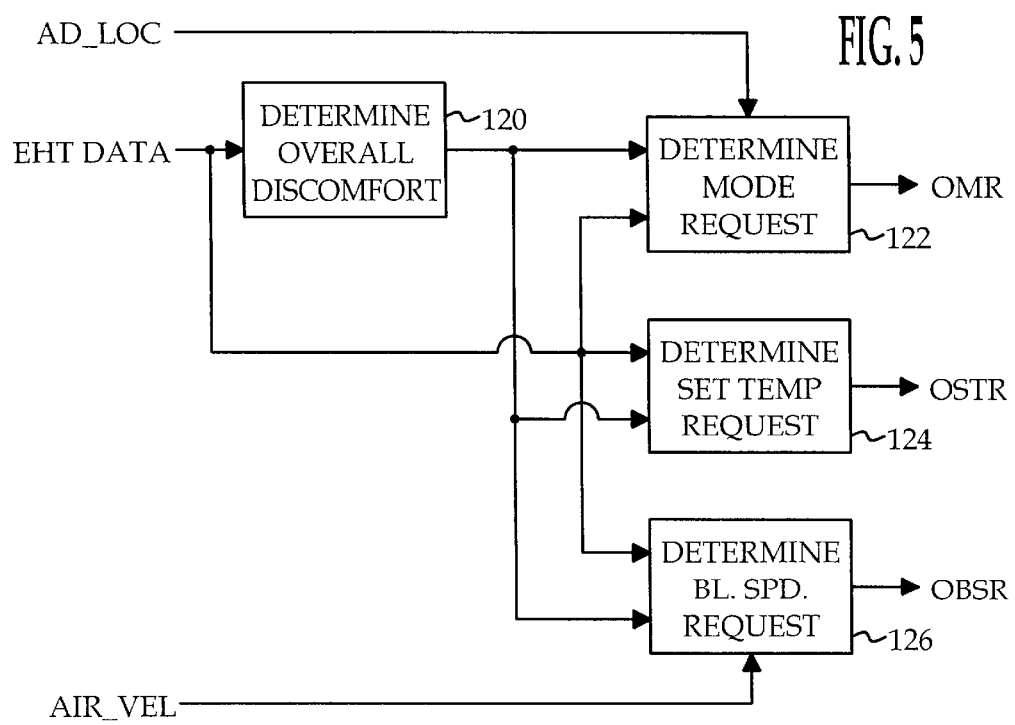
FIG. 5 is a block diagram of a human comfort reaction model according to this invention.

In general, the functionality of CRM 42 is illustrated by the block diagram of FIG. 5, where the blocks 120–126 cooperate to determine the occupant requests (OMR, OSTR, OBSR) for air delivery mode, set temperature, and blower speed. The block 120 is responsive to the EHT data developed by TCM 40, and determines an overall or cumulative discomfort indication according to the deviation of the EHT data from optimal EHT values. The block 122 evaluates the overall occupant discomfort data, along with the air discharge location data (AD_LOC) developed by VPM 36, and determines if the air delivery mode could be adjusted to improve the comfort at one or more of the predefined body segments for which EHT data is available. Similarly, the block 124 evaluates the overall occupant discomfort data, and determines if the set temperature could be adjusted to improve the comfort at one or more of the predefined body segments for which EHT data is available. And finally, the block 126 evaluates the overall occupant discomfort data, along with the air velocity data (AIR_VEL) developed by VPM 36, and determines if the blower speed could be adjusted to improve the comfort at one or more of the predefined body segments for which EHT data is available. Also, the CRM 42 could be expanded to model reaction to windshield fogging, system noise (due to blower speed and air discharge location, for example), and so on, to enhance its simulation of human system overrides.

At the same time, COM 44 reacts to the discomfort function DF by adjusting one or more calibration parameters of the climate control algorithm modeled by CCSM 30. These parameters may include both transient phase parameters (i.e., those parameters that govern the transient response of the system) and steady-state parameters (i.e., those parameters that govern the steady-state response of the system). The COM 44 averages the discomfort function DF over both the transient and steady-state phases of a simulation run, so that the averaged discomfort function (DF_AVG) can be considered as a function of both the transient and steady-state calibration parameters. A multi-dimensional optimization method (such as the Conjugate Gradient method) is then used to find a set of calibration values that will optimize (minimize) DF_AVG, and COM 44 applies such set of calibration values to CCSM 30.

While the process of adjusting the algorithm calibration parameters has been described above as an automatic function performed by COM 44, it will be recognized that the adjustments can alternatively be carried out manually by a calibration engineer, if desired. For example, if the transient response of the simulation is unsatisfactory, the calibration engineer can manually adjust the transient calibration parameters and re-start the simulation to see if the transient performance is improved. However, it should also be recognized the ability of the optimization method (whether manual or automatic) to minimize occupant discomfort is constrained by the control strategy of the climate control algorithm modeled by CCSM 30. In other words, if the control strategy is flawed, optimization of its calibration parameters may still fail to produce the desired occupant comfort levels. In such case, the control algorithm strategy must be re-visited and modified by system engineers, after which the above-described methods can be utilized to optimize the modified algorithm.

In summary, the present invention provides a radically new methodology for generating improved automatic climate control system algorithms on a significantly abbreviated timetable and with significantly reduced cost, compared to conventional approaches. While described in reference to the illustrated embodiment, it is expected that various modifications in addition to those mentioned above will occur to those skilled in the art. For example, a greater or lesser number of factors can be modeled, different software tools can be utilized to model the various functional blocks, and so on. Thus, it will be understood that methods incorporating these and other modifications may fall within the scope of this invention, which is defined by the appended claims.

What is claimed is:

1. A method of generating a control algorithm for execution by an automatic climate control unit to control an air conditioner of a motor vehicle, comprising the steps of:

simulating a vehicle plant including said air conditioner and a cabin of said motor vehicle;

simulating an automatic climate control unit executing a pre-defined control algorithm responsive to vehicle plant parameters and user input parameters;

cross-coupling the simulated vehicle plant and the simulated automatic climate control unit to simulate a temperature, velocity and location of air to be discharged into said cabin by said air conditioner for satisfying the user input parameters;

simulating a comfort level of a vehicle occupant in response to the simulated air temperature, velocity and location, and an occupant reaction to discomfort, including a requested occupant adjustment of one or more of the user input parameters;

adjusting the user input parameters of the simulated automatic climate control unit in accordance with said requested occupant adjustment to thereby modify the pre-defined control algorithm of the simulated automatic climate control unit in a way that increases the simulated comfort level; and generating the control algorithm for execution by the automatic climate control unit based on the modified control algorithm of said simulated automatic climate control unit.

2. The method of claim 1, wherein the simulated automatic climate control unit develops adjustments for control parameters of the simulated air conditioner in response to the vehicle plant parameters and a specified set temperature.

3. The method of claim 2, including the step of:

overriding the control parameter adjustments developed in response to the vehicle plant parameters and the specified set temperature when said user input parameters are adjusted in response to said requested occupant adjustment.

4. The method of claim 1, including the steps of:

determining that the simulated comfort level could be improved by adjusting the simulated temperature of the discharged air; and requesting occupant adjustment of a user input parameter corresponding to the temperature of the discharged air.

5. The method of claim 1, including the steps of:

determining that the simulated comfort level could be improved by adjusting the simulated velocity of the discharged air; and requesting occupant adjustment of a user input parameter corresponding to the velocity of the discharged air.

6. The method of claim 1, including the steps of:

determining that the simulated comfort level could be improved by adjusting the simulated location of the discharged air; and requesting occupant adjustment of a user input parameter corresponding to the location of the discharged air.

7. The method of claim 1, wherein the pre-defined control algorithm includes calibrated parameters, and the method includes the step of:

adjusting said calibrated parameters so as to optimize the simulated comfort level of the vehicle occupant.

8. The method of claim 1, wherein the pre-defined control algorithm includes transient parameters and steady-state parameters, and the method includes the steps of:

averaging the simulated comfort level of the vehicle occupant during a period of simulated operation of said vehicle plant and said automatic climate control unit;

determining a set of calibration values for said transient and steady-state parameters for optimizing the averaged simulated comfort level; and adjusting said transient and steady-state parameters in accordance with the determined set of calibration values.

* * * * *